March 31, 1931. C. A. PARSONS ET AL 1,799,021
ELECTRICAL CONDUCTOR
Filed March 3, 1927   3 Sheets-Sheet 3

INVENTORS:
CHARLES A. PARSONS
JESSEL ROSEN
WILLIAM D. HORSLEY
by Spear, Middleton, Donaldson & Hall
Attys.

Patented Mar. 31, 1931

1,799,021

UNITED STATES PATENT OFFICE

CHARLES ALGERNON PARSONS, JESSEL ROSEN, AND WILLIAM DOUGLASS HORSLEY, OF NEWCASTLE-ON-TYNE, ENGLAND; SAID ROSEN AND SAID HORSLEY ASSIGNORS TO SAID PARSONS

ELECTRICAL CONDUCTOR

Application filed March 3, 1927, Serial No. 172,408, and in Great Britain April 16, 1926.

This invention relates to electrical apparatus such as dynamo-electric machinery, transformers or the like having slots containing conductors.

In many cases, as for example in high-voltage generators, difficulties arise in keeping down the bulk of the apparatus and the main object of the present invention is to provide arrangements which may assist in overcoming these difficulties.

With such an object, the invention consists in the combination of elements hereinafter described and particularly pointed out in the claims.

Referring to the accompanying drawings which are of a diagrammatic nature:—

Figure 5 shows the application of the invention to a circular slot; while

Figures 3, 4, 5 and 6 are drawn to a larger scale than Figure 1.

When desirable corresponding parts in the different figures are denoted by the same reference symbols.

In carrying the invention into effect according to one form as applied to a three-phase alternating-current generator, (see Figures 1, 2 and 3) the stator slots, A, are of the usual oblong shape of equal cross-sectional area and spaced apart at equal distances, six of these slots associated with the generation of one phase being lettered $A^1$ to $A^6$. Each slot contains three rectangular conductors, B, C, D (see typical slot in Figure 3) connected in series and arranged side by side in the slot.

Figure 1:
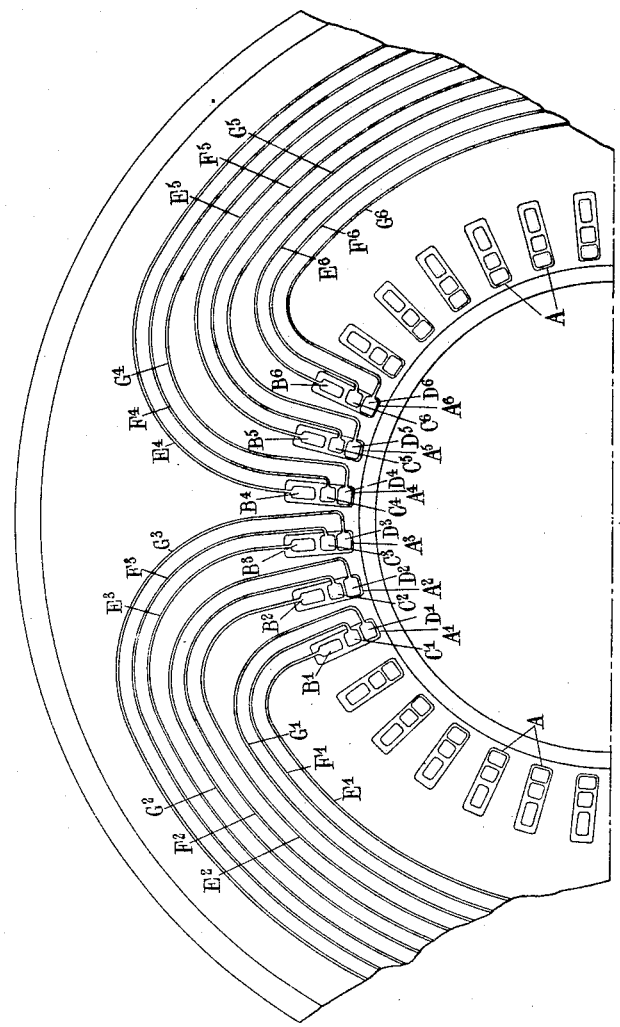
Figure 1 shows a half end view of the slots and end windings of one phase of a three-phase alternating-current generator, Figure 2 being a corresponding diagram of the armature windings.
Figure 2:
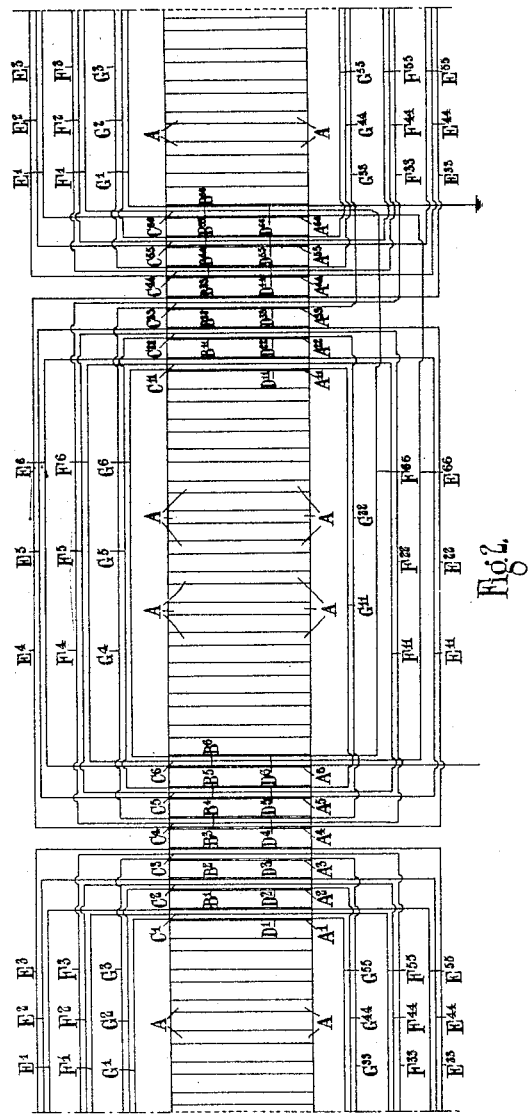

In Figures 1 and 2, the three conductors in slot, $A^1$, are lettered respectively $B^1$, $C^1$, $D^1$, those in slot, $A^2$, are lettered $B^2$, $C^2$, $D^2$, and so on for the other slots concerned, the end windings of the B, C and D conductors in each slot being denoted respectively by the letters, E, F and G, with the appropriate numerical suffix.

In Figure 2, the slots diametrically opposite to those shown in Figure 1, with their conductors and end windings, are indicated by the corresponding letters with doubled numerical suffixes.

Figure 3:
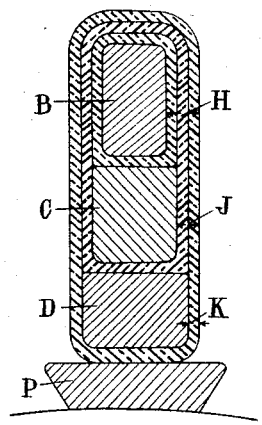
Figure 3 shows a view of a rectangular slot and the conductors disposed therein.

Taking the typical slot of Figure 3, the conductor, B, carrying the highest voltage is at the bottom of the slot, the conductor, C, carrying the middle voltage is in the middle of the depth of the slot and the conductor, D, carrying the lowest voltage is at the top of the slot.

In order to make the best use of the available cross-sectional area of each slot, the high-voltage conductor, B, is of such a shape as to leave the required thickness, H, of insulation around it when inserted in the bottom of the slot, the next conductor, C, being of the same cross-sectional area but wider so that it is stepped in relation to the high-voltage conductor, B, and has a less thickness of insulation, J, while finally the low-voltage conductor, D, which is again of the same area, is likewise wider than the middle-voltage conductor in relation to which it is stepped so that its insulation, K, is the thinnest.

In accordance with a further part of the invention, sheaths may be provided for equalizing the potential drop across the slot insulation.

Figure 4:
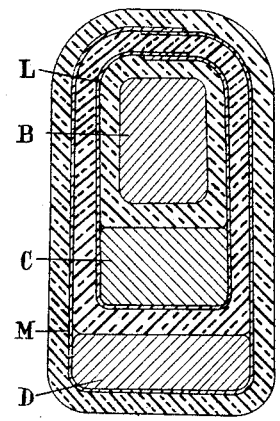
Figure 4 shows a view of a rectangular slot and conductors therein in which sheaths are provided to equalize the potential drop across the slot insulation.

Thus, according to one construction (see Figure 4) the sheath, L, associated with the conductor, C, is U-shaped, the ends being lapped over to enclose the adjacent higher voltage conductor, B, and similarly with respect to the sheath, M, associated with the conductor, D.

It will be seen that many variations may be made from the typical cases described above, the conductors for example being of the same shape and size and the slots themselves being stepped.

The same principles may be likewise applied, mutatis mutandis, to the case of slots which are of a tapered, circular or other non-rectangular form.

Figure 5:
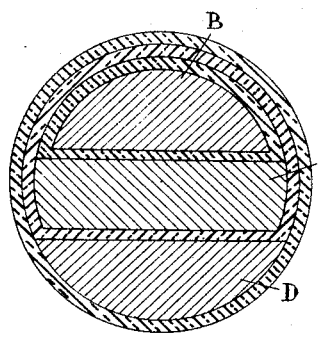

In the case of the circular type, (see Figure 5) the individual conductors, B, C, D, conveniently take the form of segments of circles of increasing diameter, the segments having either one or two plane surfaces as shown.

The individual conductors, which may be of any suitable number, with their sheaths if any, forms a complete bar two or more of which may be contained in one slot, if desired; for example, (see Figure 6) in a two-layer winding two bars, N, O, arranged base to base may be inserted in each rectangular or similar slot.

The complete bars as described may in some cases be carried round from slot to slot as end windings.

Figure 6:
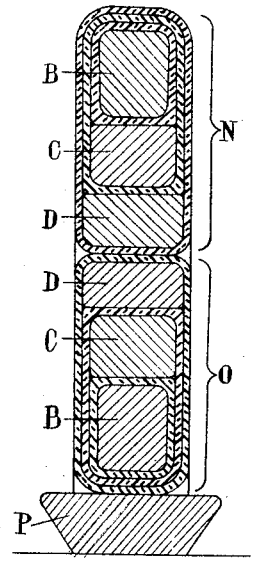
Figure 6 shows a rectangular slot containing two bars each containing three conductors.

Further, the slots themselves may be of the open, closed or semi-closed type, the complete conductor bar being held in place when desirable by the usual wedges, such as, P, shown in Figures 3 and 6.

Or again, the slots or conductors may be of different sizes or combinations of these methods may be adopted and so forth.

It is desirable that the neutral point of the winding be earthed or other appropriate steps taken to keep it at approximately earth potential and the phase terminals at the designed potential above earth.

Although, to make the nature of the invention clear, a special application thereof has been described in relation to the slots of an alternating-current generator, it will nevertheless be obvious that the invention is equally applicable to other forms of electrical apparatus having slots the cross-sectional area of which it is desired to use to the best advantage, while in addition, other methods of grading may be adopted without exceeding the scope of the invention as set out in the claims appendant hereto.

Having now described our invention what we claim as new and desire to secure by Letters Patent is:—

1. A compound electrical conductor bar of rectangular cross-section built up of a plurality of longitudinally-disposed conductors rectangular in cross-section and arranged in a row or line side by side, said conductors being of the same area but of progressively increasing width, insulation between said conductors and insulation surrounding said conductors, said insulation varying in thickness progressively along said row or line so that the conductor of minimum width is associated with the insulation of maximum thickness.

2. A compound electrical conductor bar comprising a conductor, insulation of uniform thickness surrounding said conductor to form an insulated unit of the first order, a second conductor disposed on one side of said insulated unit of the first order, and insulation also of uniform thickness surrounding said insulated unit of the first order and said second conductor to form an insulated unit of the second order.

3. A compound electrical conductor bar as claimed in claim 2 with a sheath electrically coupled to said second conductor and within the insulation surrounding said insulated unit of the first order.

4. In combination in electrical apparatus, a member having therein a slot, a plurality of electrically-associated conductors of different voltages spaced apart side by side in said slot and running longitudinally thereof to leave a certain space between the highest-voltage conductor and the walls of said slot and a lesser space between the next lower voltage conductor and the walls of said slot, and insulation filling said spaces and between said conductors.

5. The combination claimed in claim 4, in which the space between said conductors and the walls of said slot varies progressively down the depth of said slot.

6. The combination claimed in claim 4, in which both said slot and said conductors are substantially rectangular in cross section, said conductors being of the same cross-sectional area but of different shape.

7. The combination claimed in claim 4, in which the individual conductors are connected in series.

8. In combination in electrical apparatus, a member having therein a slot, a plurality of electrically-coupled conductors of different voltages spaced apart side by side in said slot and running longitudinally thereof to leave a certain space between the highest-voltage conductor and the walls of said slot and a lesser space between the next lower voltage conductor and the walls of said slot, insulation filling said spaces and between said conductors and metallic sheaths surrounding certain of said conductors and dividing said insulation to equalize the potential drop thereacross.

9. The combination claimed in claim 8, in which a certain conductor is surrounded by a metallic sheath electrically coupled to the juxtaposed conductor, said two conductors being surrounded by a metallic sheath electrically coupled to the next juxtaposed conductor.

10. In a device of the class described, a core having a slot for the reception of conductors, a plurality of conductors of different voltage disposed in superposed relation in said slot, a layer of insulation of uniform thickness about the highest-voltage conductor, a layer of insulation also of uniform thickness about the conductor of next lower voltage, said last-named layer of insulation also surrounding said first-named conductor and its insulating layer.

11. A compound electrical conductor bar comprising a conductor and insulation surrounding said conductor to form an insulated unit of the first order; a second conductor disposed laterally of said insulated unit of the first order and insulation surrounding said insulated unit of the first order and said second conductor to form an insulated unit of the second order, together with a sheath electrically coupled to said second conductor and disposed within said insulation surrounding said insulated unit of the first order.

12. A compound electrical conductor bar as claimed in claim 11, with the addition of a third conductor disposed laterally of said insulated unit of the second order and insulation surrounding said insulated unit of the second order and said third conductor to form an insulated unit of the third order; and with the addition also of a sheath electrically coupled to said third conductor and disposed within said insulation surrounding said insulated unit of the second order.

13. A compound electrical conductor bar comprising a conductor, insulation surrounding said conductor to form an insulated unit of the first order, said insulated unit having a certain overall dimension in one direction of its cross-section, a second conductor disposed on one side of said insulated unit of the first order and having a dimension the same as said certain overall dimension of said unit, and insulation surrounding said insulated unit and said second conductor to form an insulated unit of the second order.

14. A compound electrical conductor bar comprising a conductor, insulation surrounding said conductor to form an insulated unit of the first order with a certain contour in cross-section, a second conductor in juxtaposed relation to said insulated unit and having a contour in cross-section forming a continuation of the contour of said insulated unit and insulation surrounding said insulated unit and said second conductor to form an insulated unit of the second order.

In testimony whereof we have signed our names to this specification.

CHARLES ALGERNON PARSONS.
JESSEL ROSEN.
WILLIAM DOUGLASS HORSLEY.